United States Patent
Majjigi et al.

(10) Patent No.: US 10,845,203 B2
(45) Date of Patent: Nov. 24, 2020

(54) INDOOR/OUTDOOR DETECTION USING A WEARABLE COMPUTER

(71) Applicant: Apple Inc., Cupertino, CA (US)

(72) Inventors: Vinay R. Majjigi, Mountain View, CA (US); Suresh B. Malakar, Cupertino, CA (US); Bharath Narasimha Rao, Mountain View, CA (US); Karthik Jayaraman Raghuram, Mountain View, CA (US); Hung A. Pham, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/146,688

(22) Filed: Sep. 28, 2018

(65) Prior Publication Data

US 2019/0368884 A1 Dec. 5, 2019

Related U.S. Application Data

(60) Provisional application No. 62/679,722, filed on Jun. 1, 2018.

(51) Int. Cl.
*G01C 21/16* (2006.01)
*G01C 21/34* (2006.01)
(Continued)

(52) U.S. Cl.
CPC ......... *G01C 21/3415* (2013.01); *G01C 21/16* (2013.01); *G01C 22/006* (2013.01); *G06F 1/163* (2013.01); *H04W 4/029* (2018.02)

(58) Field of Classification Search
None
See application file for complete search history.

(56) References Cited

U.S. PATENT DOCUMENTS 9,008,694 B2   4/2015 Fuller
9,148,483 B1 * 9/2015 Molettiere ............ H04L 67/22
(Continued)

FOREIGN PATENT DOCUMENTS

CA         2759879 A1 * 11/2010 ......... A63B 24/0062

OTHER PUBLICATIONS

Khan et al., "Activity Recognition on Smartphones via Sensor-Fusion and KDA-Based SVMs", 2014, International Journal of Distributed Sensor Networks, vol. 2014, Article ID 503291, p. 1-14 (Year: 2014).*

(Continued)

*Primary Examiner* — Tamara L Weber
(74) *Attorney, Agent, or Firm* — Fish & Richardson P.C.

(57) ABSTRACT

Embodiments are disclosed for indoor/outdoor detection using a mobile device, such as wearable computer (e.g., smartwatch). In an embodiment, a method comprises: receiving, by one or more processors of a wearable computer, wireless access point (AP) scan data, global navigation satellite system (GNSS) data and inertial sensor data; determining, by the one or more processors, a first state of the wearable computer based on the wireless AP scan data; determining, by the one or more processors, a second state of the wearable computer based on a comparison of the GNSS data and the inertial sensor data; and outputting, by the one or more processors, an indoor/outdoor signal indicating that the wearable computer is indoors or outdoors based on the first and second states.

21 Claims, 11 Drawing Sheets

(51) Int. Cl.
*H04W 4/029* (2018.01)
*G06F 1/16* (2006.01)
*G01C 22/00* (2006.01)

(56) References Cited

U.S. PATENT DOCUMENTS

| | | | |
|---|---|---|---|
| 9,572,533 B2 * | 2/2017 | Venkatraman | A61B 5/0205 |
| 9,820,232 B2 | 11/2017 | Zappi | |
| 2015/0097731 A1 | 4/2015 | Russell | |
| 2017/0078854 A1 | 3/2017 | Swaminathan | |

OTHER PUBLICATIONS

Del Rosario et al., "Tracking the Evolution of Smartphone Sensing for Monitoring Human Movement", 2015, Sensors, p. 18901-18933 (Year: 2015).*

* cited by examiner

INDOOR/OUTDOOR DETECTION USING A WEARABLE COMPUTER

CROSS-REFERENCE TO RELATED APPLICATION

This application claims priority to U.S. Provisional Application No. 62/679,722, filed Jun. 1, 2018, the entire contents of which are incorporated herein by reference.

TECHNICAL FIELD

This disclosure relates generally to wearable computers and mobile fitness applications.

BACKGROUND

Wearable computers (e.g., a smartwatch) are growing in popularity with health and fitness enthusiasts. The typical smartwatch can run fitness applications that perform various functions, such as allowing users to set fitness goals, track caloric intake, gather workout ideas, and share progress on social media. The typical smartwatch includes a variety of sensors, such as inertial sensors (e.g., accelerometers, gyroscopes), a global navigation satellite system (GNSS) receiver for localization, a wireless transceiver for localization and wireless communication with wireless networks and other devices, a barometric pressure sensor for altitude determination and a heart rate sensor for measuring heart rate. Some fitness applications can use these sensors to detect when the user has engaged in a fitness activity. For example, a digital pedometer in the smartwatch can be used to count the user's steps and stride length based on acceleration data from an accelerometer. The step count or step frequency can be used with GNSS position and speed data to determine if the user is walking, running or riding a bicycle.

A problem with many fitness applications is the inability of the application to determine if a particular fitness activity is indoors or outdoors. For example, if sensors on the smartwatch detect that the user is running, the fitness application does not know if the user is running outdoors on a track or running indoors on a treadmill. This ambiguity can lead to erroneous output like displaying a map on the smartwatch when the user is running indoors on a treadmill. Also, if the user is indoors then it is desirable to turn off power consuming component (e.g., the GNSS receiver) to save power. Depending on whether the user is indoors or outdoors, different sensors may be used to measure the user's exertion, such as sensing heart rate to estimate calories burned while indoors.

SUMMARY

Embodiments are disclosed for indoor/outdoor detection using a mobile device (e.g., a smartwatch). In an embodiment, a method comprises: receiving, by one or more processors of a wearable computer, wireless access point (AP) scan data, global navigation satellite system (GNSS) data and inertial sensor data; determining, by the one or more processors, a first state of the wearable computer based on the wireless AP scan data; determining, by the one or more processors, a second state of the wearable computer based on a comparison of the GNSS data and the inertial sensor data; and outputting, by the one or more processors, an indoor/outdoor signal indicating that the wearable computer is indoors or outdoors based on the first and second states.

In an embodiment, an apparatus comprises: one or more processors; memory storing instructions that when executed by one or more processors, cause the one or more processors to perform operations comprising: receiving wireless access point (AP) scan data, global navigation satellite system (GNSS) data and inertial sensor data; determining a first state of the apparatus based on the wireless AP scan data; determining a second state of the apparatus based on a comparison of the GNSS data and the inertial sensor data; and outputting an indoor/outdoor signal indicating that the wearable computer is indoors or outdoors based on the first and second states.

In an embodiment, a non-transitory, computer-readable storage medium has stored thereon instructions that when executed by one or more processors of a wearable computer, cause the one or more processors to perform operations comprising: receiving wireless access point (AP) scan data, global navigation satellite system (GNSS) data and inertial sensor data; determining a first state of the wearable computer based on the wireless AP scan data; determining a second state of the wearable computer based on a comparison of the GNSS data and the inertial sensor data; and outputting an indoor/outdoor signal indicating that the wearable computer is indoors or outdoors based on the first and second states.

The details of one or more implementations of the subject matter are set forth in the accompanying drawings and the description below. Other features, aspects and advantages of the subject matter will become apparent from the description, the drawings and the claims.

DETAILED DESCRIPTION

Example System

Figure 1B:
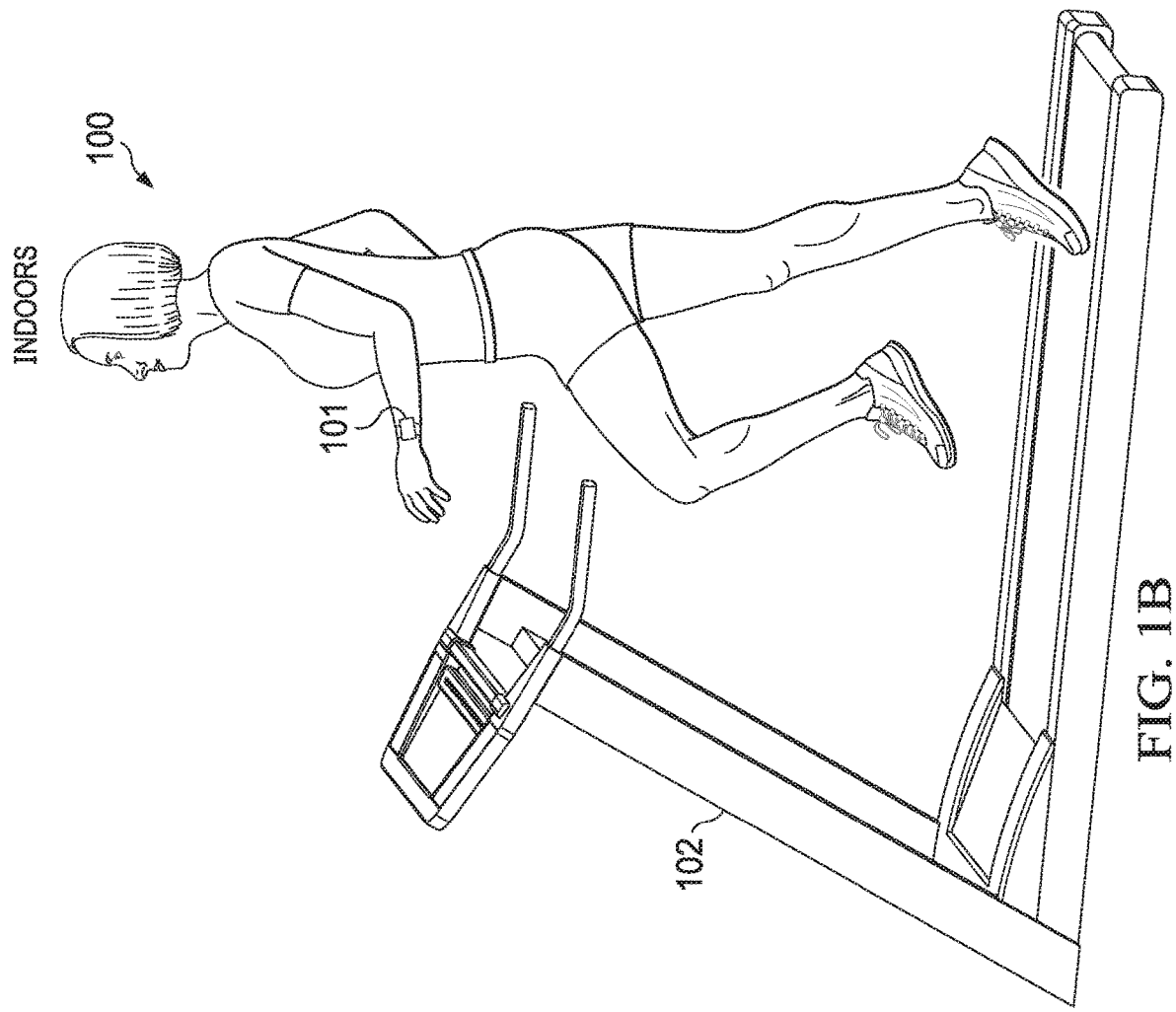
FIGS. 1A-1D illustrate system for indoor/outdoor detection of a fitness activity, according to an embodiment.
Figure 1A:
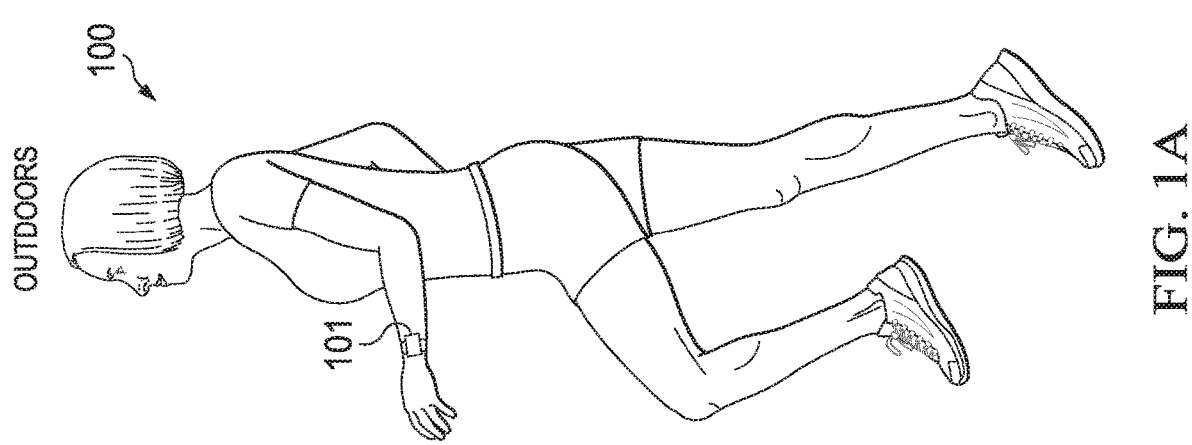
Figure 1C:
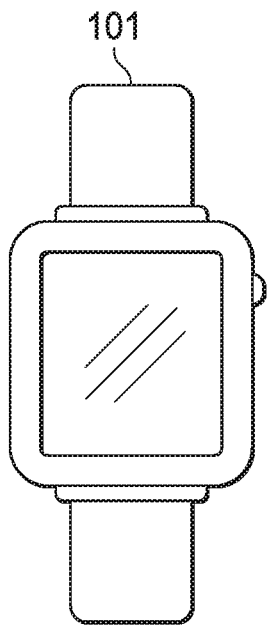
Figure 1D:
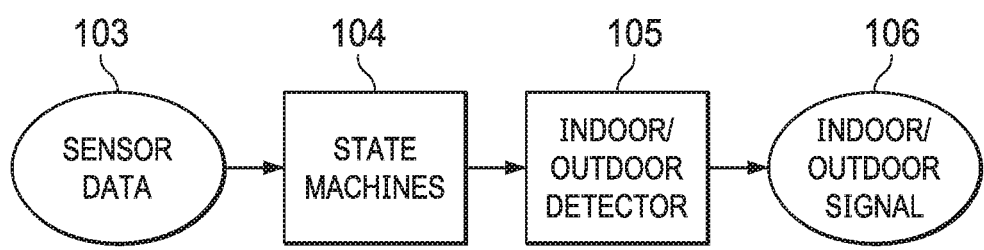

FIGS. 1A-1D illustrate system for indoor/outdoor detection of a fitness activity, according to an embodiment. FIG. 1A shows user 100 running outdoors and FIG. 1B shows user 100 running on treadmill 102. Wearable computer 101 (e.g., a smartwatch, fitness band) is worn on the wrist of user 100. Wearable computer 101 includes a number of sensors that provide sensor data 103 as shown in FIG. 1G. In an embodiment, the sensors can include but are not limited to: accelerometers, gyroscopes, barometric pressure sensor, GNSS receiver (e.g. a GPS receiver), wireless transceiver, magnetometer and a heart rate (HR) sensor. Wearable computer 101 also includes one or more processors for implementing a digital pedometer that takes acceleration data and gyroscope data as input and provides at least one of a step count, step frequency, stride length or distance traveled. The GNSS receiver provides position and velocity/speed of the wearable computer. The barometric pressure sensor is used to estimate the altitude of the wearable computer. The wireless transceiver receives radio frequency (RF) signals from access points (APs) of a wireless network (e.g., WiFi, cellular) or directly from other devices (e.g., using Bluetooth or Near Field technology). The HR sensor is used to detect the user's heart rate, which can be combined with a calorie model and other data (e.g., gender, height, age) to estimate calories burned by the user during a fitness activity. Wearable computer 101 includes a touch screen for displaying graphical user interfaces (GUIs) and information (e.g., workout data) and for receiving touch input or gestures.

Figure 2:
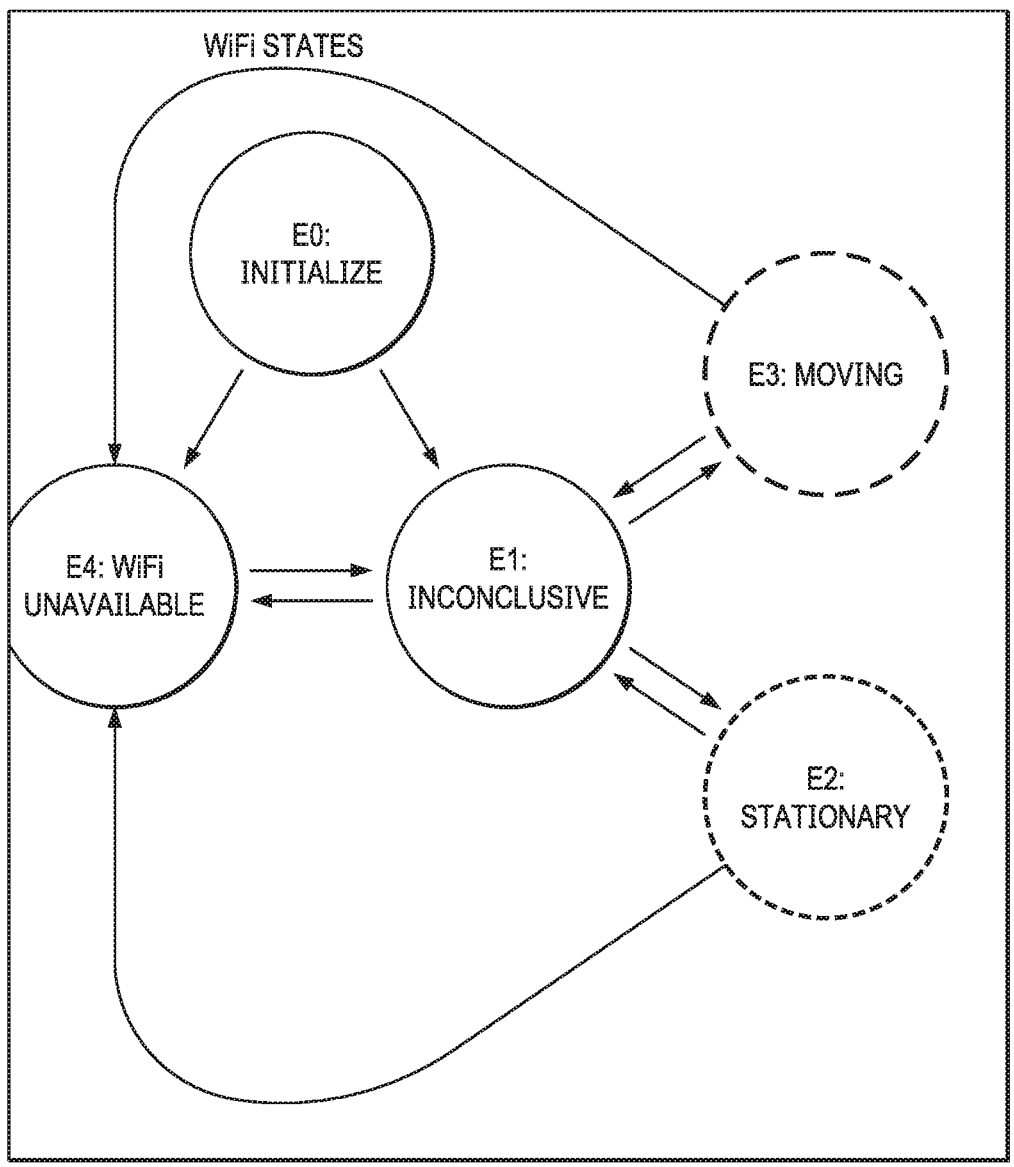
FIG. 2 is a state diagram of WiFi scan states, according to an embodiment.
Figure 3:
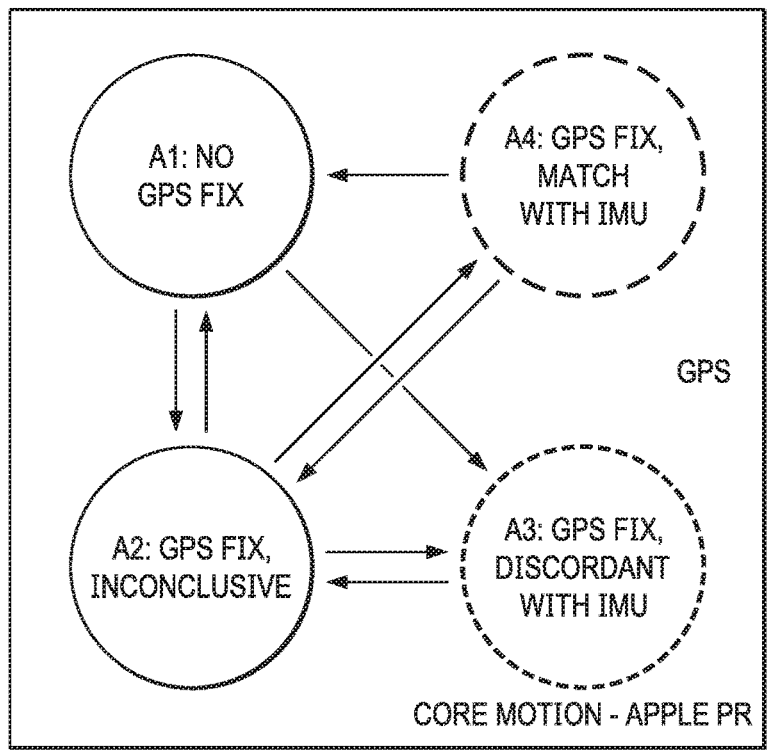
FIG. 3 is a state diagram of GNSS states, according to an embodiment.
Figure 4:
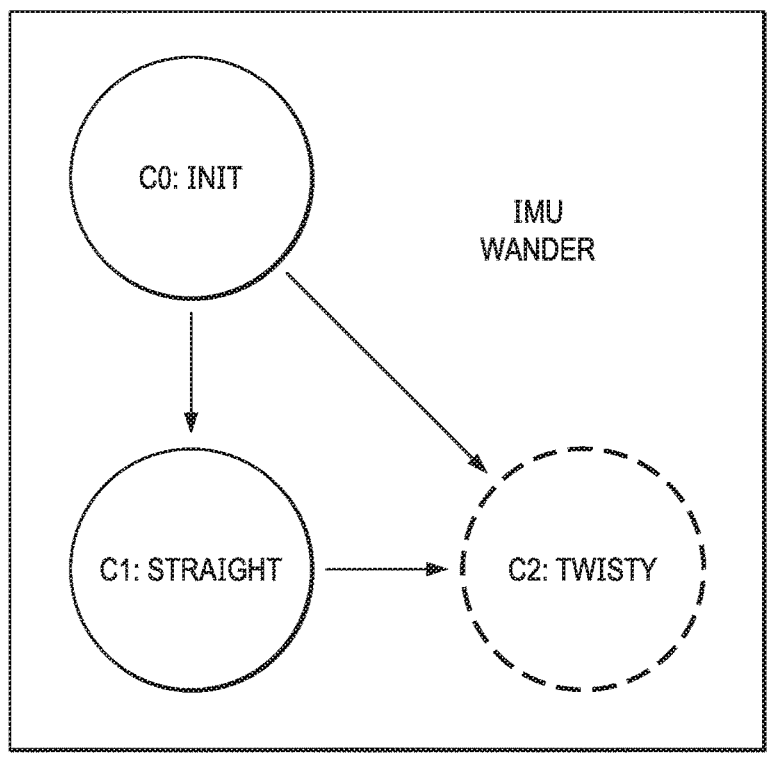
FIG. 4 is a state diagram of inertial measurement unit (IMU) wander states, according to an embodiment.

In an embodiment, sensor data 103 are input into state machines 104 for detecting various states described in reference to FIG. 2-4. The outputs of state machines 104 are input to indoor/outdoor detector 105, which generates indoor/outdoor signal 106. Indoor/outdoor signal 106 can be any signal that indicates whether or not the user is currently indoors or outdoors, including but not limited to: one or more bits, one or more codes, one or more Boolean values or one or more flags.

FIG. 2 is a state diagram of WiFi scan states, according to an embodiment. WiFi states E0-E4 include: E0 (initialize), E1 (inconclusive), E2 (stationary), E3 (moving) and E4 (WiFi unavailable). E2 (stationary) is strong indoor state (e.g., running on a treadmill) and E3 (moving) is a strong outdoor state (e.g., running on a track or trail). The WiFi scan is used to trigger a transition to another state. The wearable computer performs WiFi scans every x seconds (e.g., every 24 seconds). The wireless transceiver in the wearable computer performs a WiFi scan of RF signals transmitted by APs that are in range of the wearable computer. In an embodiment, the wireless transceiver (or a processor coupled to the wireless transceiver) computes received signal strength indicator (RSSI) values from the RF signals. In an embodiment, WiFi scan data includes for each observed AP, a media access control (MAC) address, an optional service set identifier (SSID), an RSSI value (dBm) and a timestamp. Other information can also be included in the WiFi scan data for an AP.

In an embodiment, the WiFi state diagram starts with initial state E0 and moves to state E1 or E4 based on WiFi scan data. When in state E1, the WiFi state can transition to state E2, E3 or E4 based on WiFi scan data. When in state E2 the WiFi state can transition to state E1 or E4 based on WiFi scan data. When in state E3, the WiFi state can transition to state E1 or E4 based on WiFi scan data. When in state E4, the WiFi state can transition to state to E1 based on WiFi scan data. The triggering of WiFi state transitions is further described in reference to FIGS. 8A-8C.

FIG. 3 is a state diagram of GNSS states, according to an embodiment. GNSS states A1-A4 include: A1 (no GNSS fix), A3 (GNSS fix, inconclusive), A3 (GNSS fix discordant with IMU) and A4 (GNSS fix match with IMU). A4 (GNSS fix match with IMU) is a strong outdoor state because the GNSS line-of-sight signals are available outdoors. Likewise, A3 (GNSS fix discordant with IMU) is a strong indoor state because the GNSS distance and course estimates are very different from the IMU. A GNSS receiver of wearable computer computes GNSS positions every x seconds (e.g., every 3 seconds).

In an embodiment, when in state A1, the GNSS state can move to state A2 or A3, based on a comparison of GNSS data and pedometer data (truth data). When in state A2, the GNSS state can transition to state A1, A3 or A4 based on a comparison of GNSS data and pedometer data. When in state A3, the GNSS state can transition to state A2 based on a comparison of GNSS data and pedometer data. When in state A4, the GNSS state can transition to state A1 and A2 based on a comparison of GNSS data and pedometer data. The triggering of GNSS state transitions are further described in reference to FIGS. 6 and 7.

FIG. 4 is a state diagram of inertial measurement unit (IMU) wander states, according to an embodiment. IMU wander states include: C0 (initial), C1 (straight) and C2 (twisty). C2 is a strong outdoor state because if the user is on a treadmill there will be no turning detected. The wearable computer uses IMU data (e.g., position, heading) to trigger a transition to another state. The IMU data is used to determine if the wearable computer is moving in a straight line or turning, as described further in reference to FIG. 10. When in state C0, the wander state transitions to C1 or C2 based on the IMU data. When in state C1, the wander state transitions to C2 based on IMU data.

Figure 5:
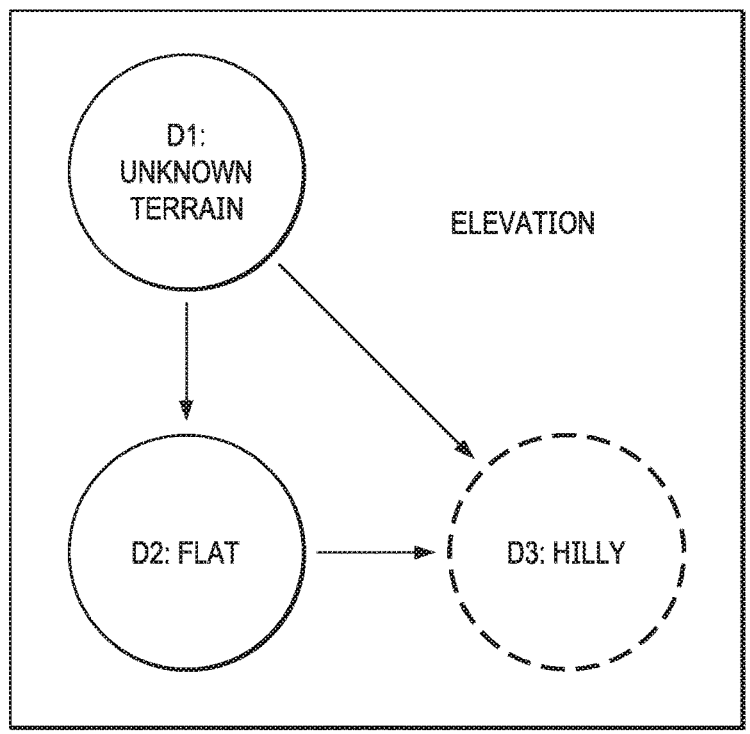
FIG. 5 is a state diagram of elevation states, according to an embodiment.

FIG. 5 is a state diagram of elevation states, according to an embodiment. Elevation states include: D1 (unknown terrain), D2 (flat) and D3 (hilly). D3 is a strong outdoor state because the user is not changing altitude if running on a treadmill. A processor of wearable computer uses barometric pressure data to trigger a transition to another state. When in state D1, the elevation state transitions to D2 or D3 based on barometric pressure data. When in state D2, the elevation state transitions to D3 based on barometric pressure data.

Figure 6:
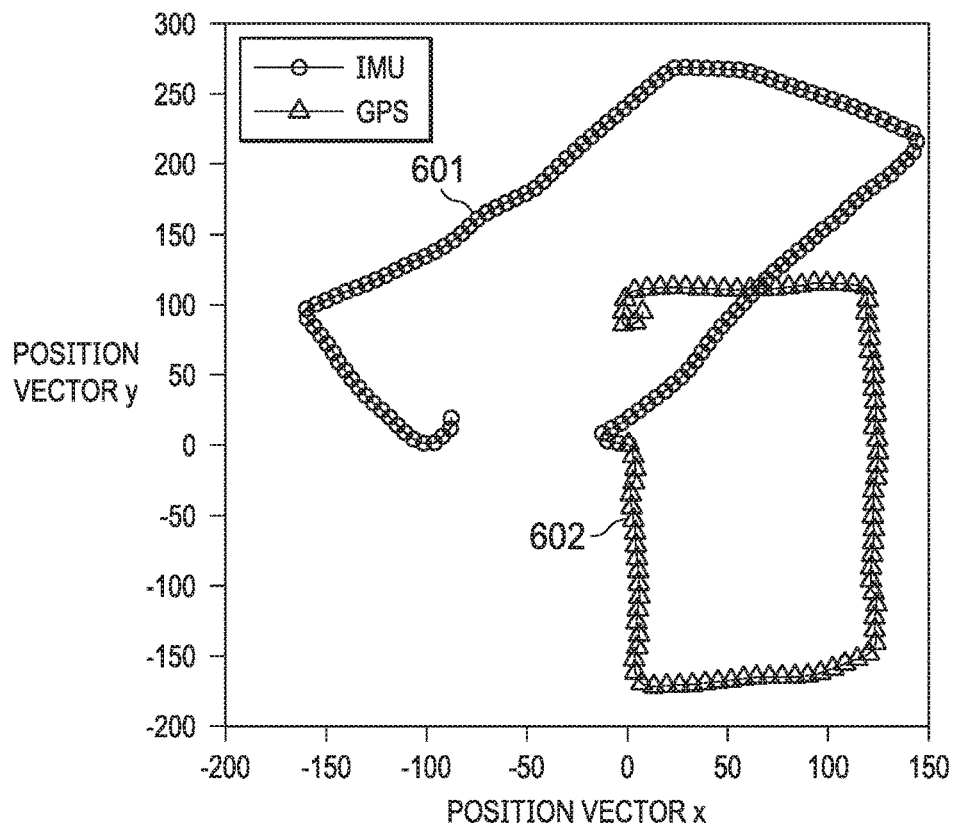
FIG. 6 is a plot comparing a pedometer trajectory and a GNSS odometer trajectory to illustrate indoor/outdoor disambiguation using a simple residual, according to an embodiment.

FIG. 6 is a plot comparing a pedometer trajectory 601 and a GNSS odometer trajectory 602 to illustrate indoor/outdoor disambiguation using a simple residual, according to an embodiment. Pedometer (IMU) propagation in a two-dimensional (2D) reference plane is given by:

$$P_N^x = P_{N-1}^x + \text{deltaPed}_N * (\cos \theta_{gyro,N}), \quad [1]$$

$$P_N^y = P_{N-1}^y + \text{deltaPed}_N * (\sin \theta_{gyro,N}), \quad [2]$$

where N is the Nth measurement, $\text{deltaPed}_N$ is the incremental distance based on step count, $\theta_{gyro,N}$ is an angle measurement from the gyroscope and, x and y are position coordinates in the 2D reference plane.

GNSS odometer propagation in a 2D reference plane is given by:

$$O_N = O_{N-1} + \text{deltaOdoDist}_N(\theta_{course,N}), \quad [3]$$

where deltaOdoDist$_N$ is the incremental distance computed from velocity/speed provided by the GNSS receiver and $\theta_{course,N}$ is the heading angle provided by the GNSS receiver.

In an embodiment, a simple residual can be computed from the pedometer and GNSS trajectory data as follows:

$$e_N = P_N O_N. \quad [4]$$

As shown in FIG. 6, the simple residual in Equation [4] does not capture discordance between GNSS and IMU because gyro drift and error propagation prevents a direct comparison of the GNSS and IMU trajectories.

Figure 7:
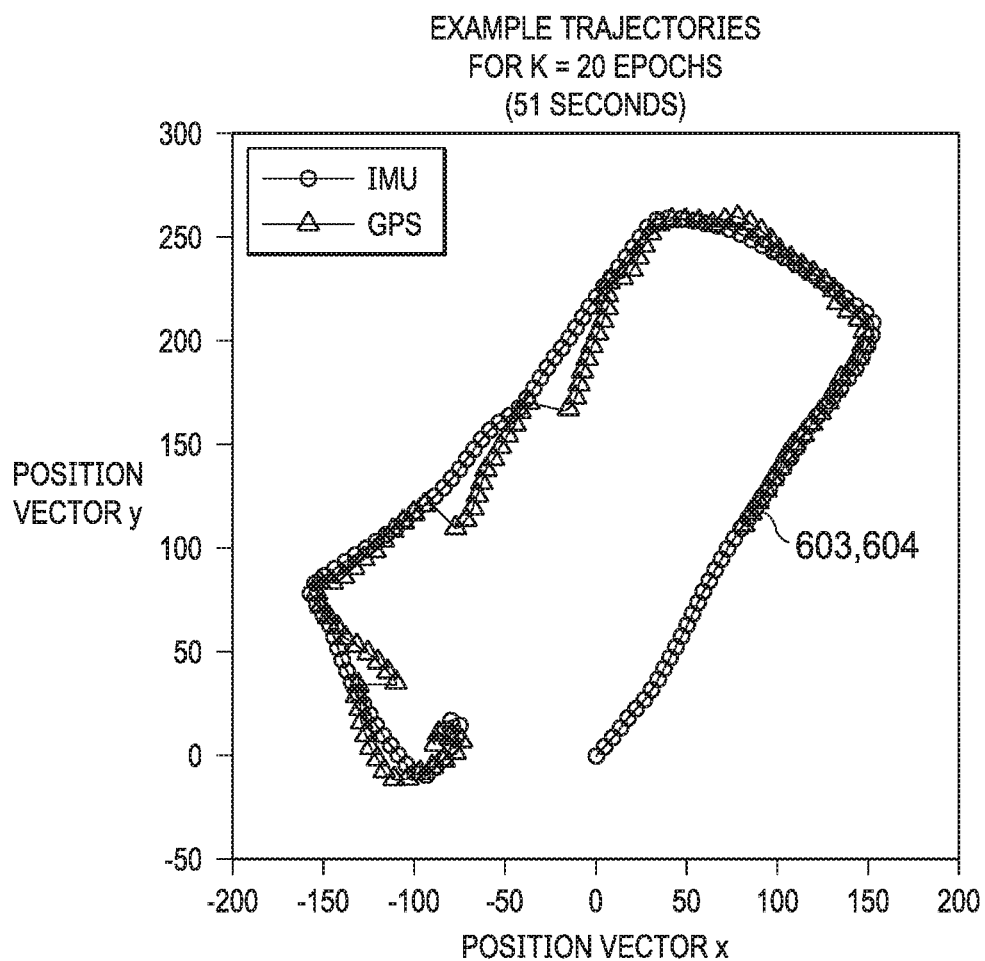
FIG. 7 is a plot comparing a pedometer trajectory and a GNSS odometer trajectory with periodic reset of the odometer trajectory to the pedometer trajectory and accounting for gyro drift and error propagation, according to an embodiment.

FIG. 7 is a plot comparing the pedometer trajectory 603 and the GNSS odometer trajectory 604 with periodic reset of the odometer trajectory to the pedometer trajectory and accounting for gyro drift and error propagation, according to an embodiment. In this example the trajectories 603, 604 include 51 seconds of data.

In this embodiment, the pedometer propagation show in Equations [1] and [2] is used as a baseline or truth data, the GNSS odometer propagation is reset every K epochs and an angular metric is computed as follows:

If mod($N,K$)==0

$$\theta_{gyro-gps-offset} = \theta_{gyro,N-1} - \theta_{course,N-1}, \quad [6]$$

where mod (N, K) is the modulo operator, N is the Nth measurement and K is the number measurement epochs.

On a short time scale the distance and angular metrics of Equations [4] and [6] can be used to determine how well the pedometer (IMU) and GNSS trajectories track. As shown in FIG. 7, by resetting the GNSS odometer trajectory every K epochs and by accounting for gyro drift and error propagation in an angular metric, discordance between the pedometer (IMU) and GNSS trajectories can be compared.

Figure 8A:
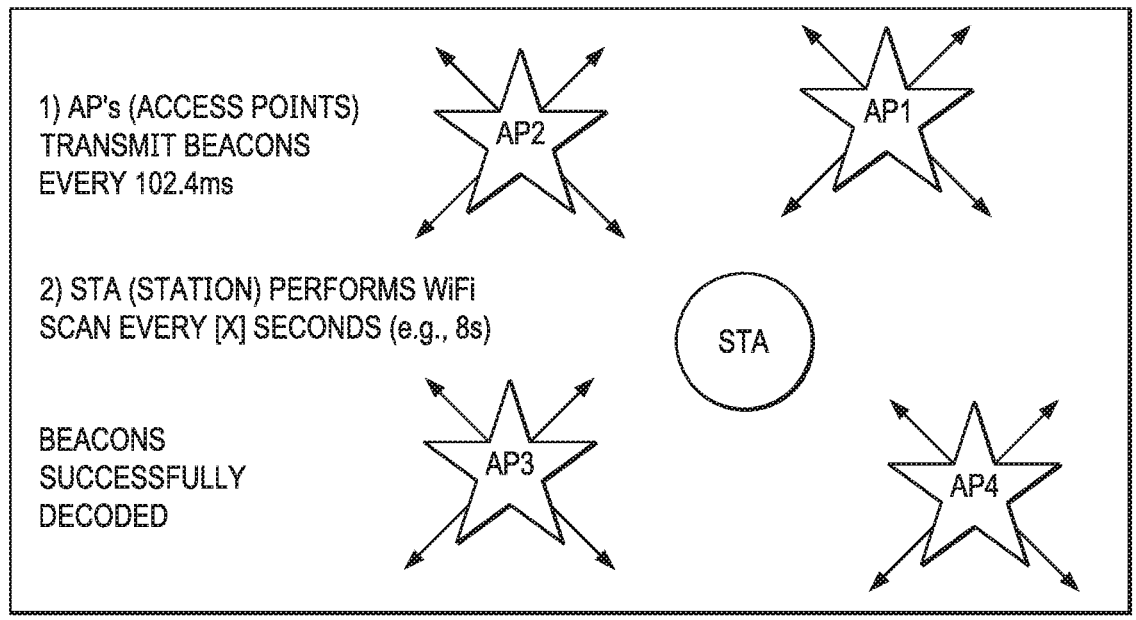
FIGS. 8A-8C illustrate using WiFi scans for indoor/outdoor detection, according to an embodiment.
Figure 8B:
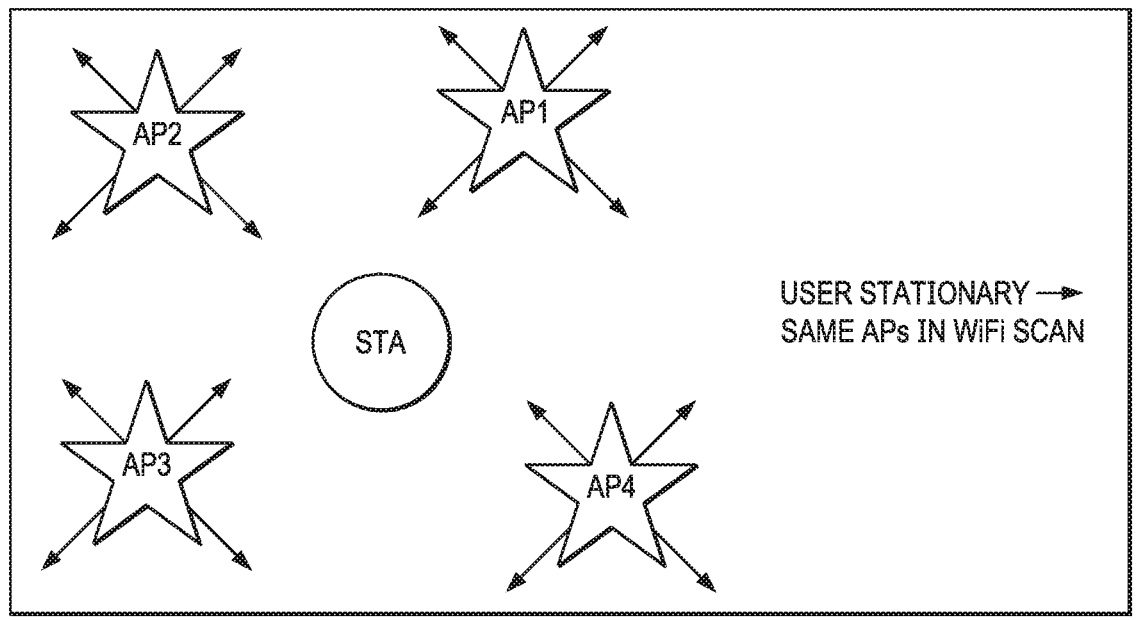
Figure 8C:
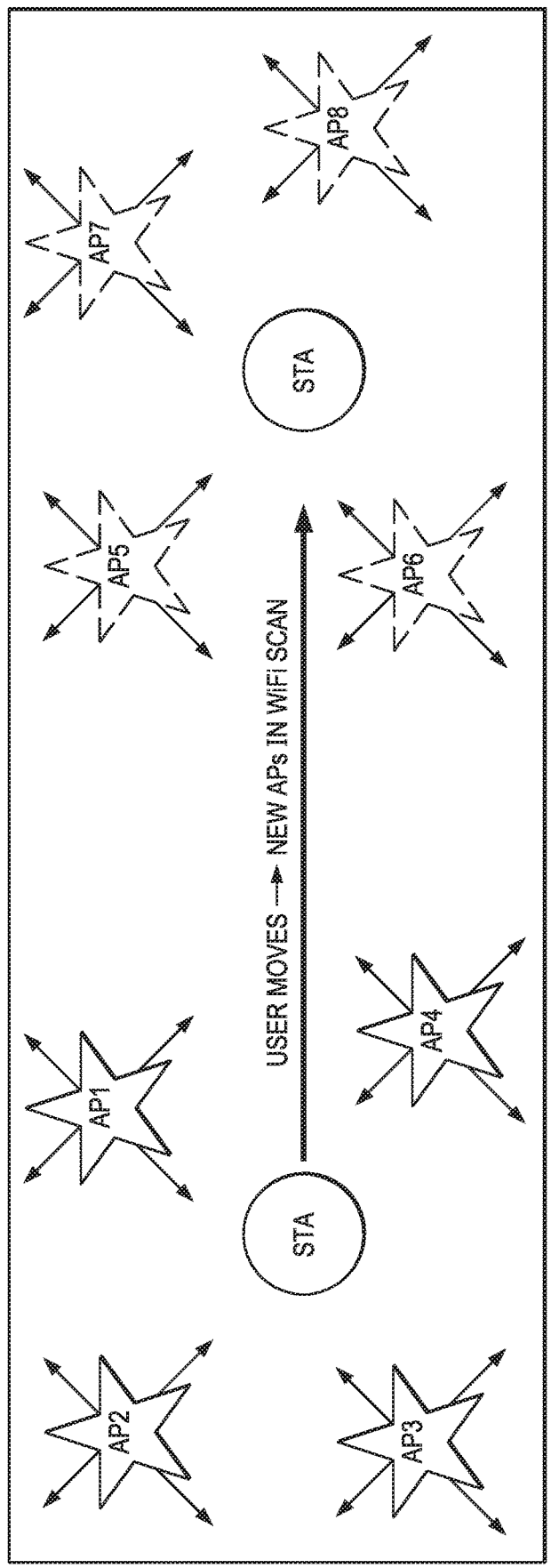

FIGS. 8A-8C illustrate using WiFi scans for indoor/outdoor detection, according to an embodiment. FIG. 8A shows an environment that includes AP1-AP4 and station STA, which can be a wearable computer. AP1-AP4 transmit beacon signals every 102.4 milliseconds. The STA performs a WiFi scan every x seconds (e.g., every 24 seconds) and decodes the beacon signal to get the WiFi data (e.g., MAC address, RSSI, timestamp, etc.). Referring to FIG. 8B, if successive WiFi scans include the same APs (stationary wearable computer), then an indoor state is assumed. Referring to FIG. 8C, if successive WiFi scans include additional APs not in the previous WiFi scans (non-stationary wearable computer), then an outdoor state is assumed.

Figure 9A:
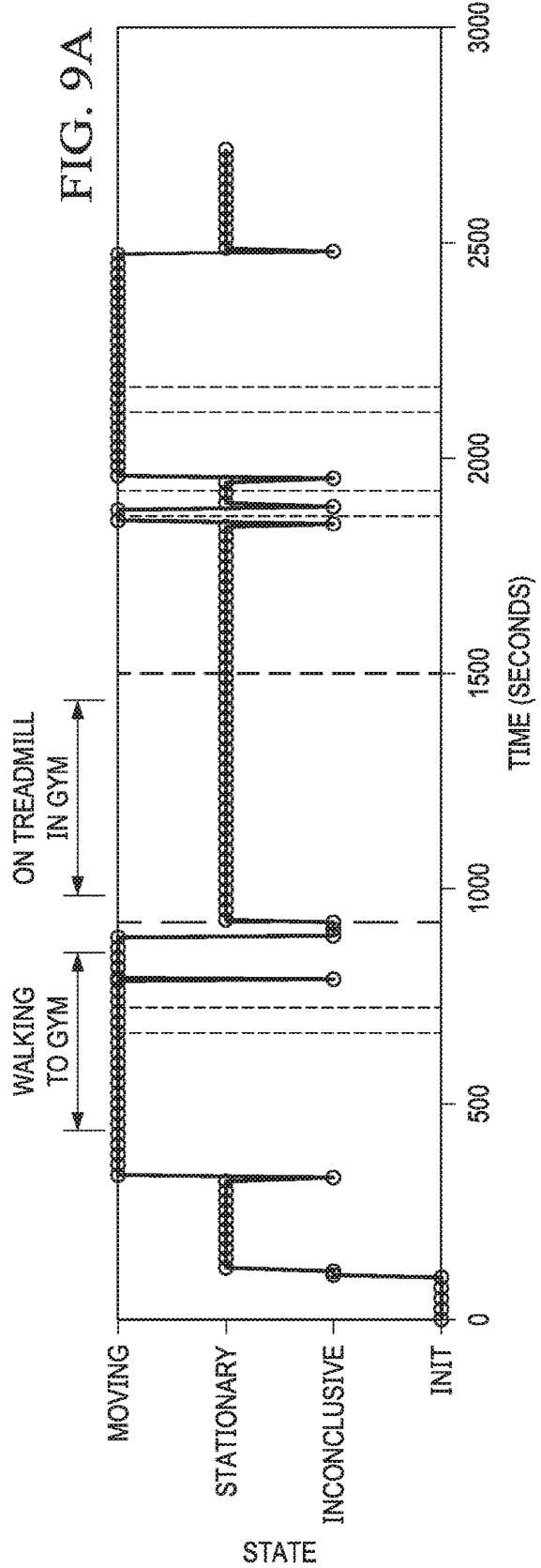
FIG. 9A is a plot of a motion state of a wearable computer versus time, according to an embodiment.
Figure 9B:
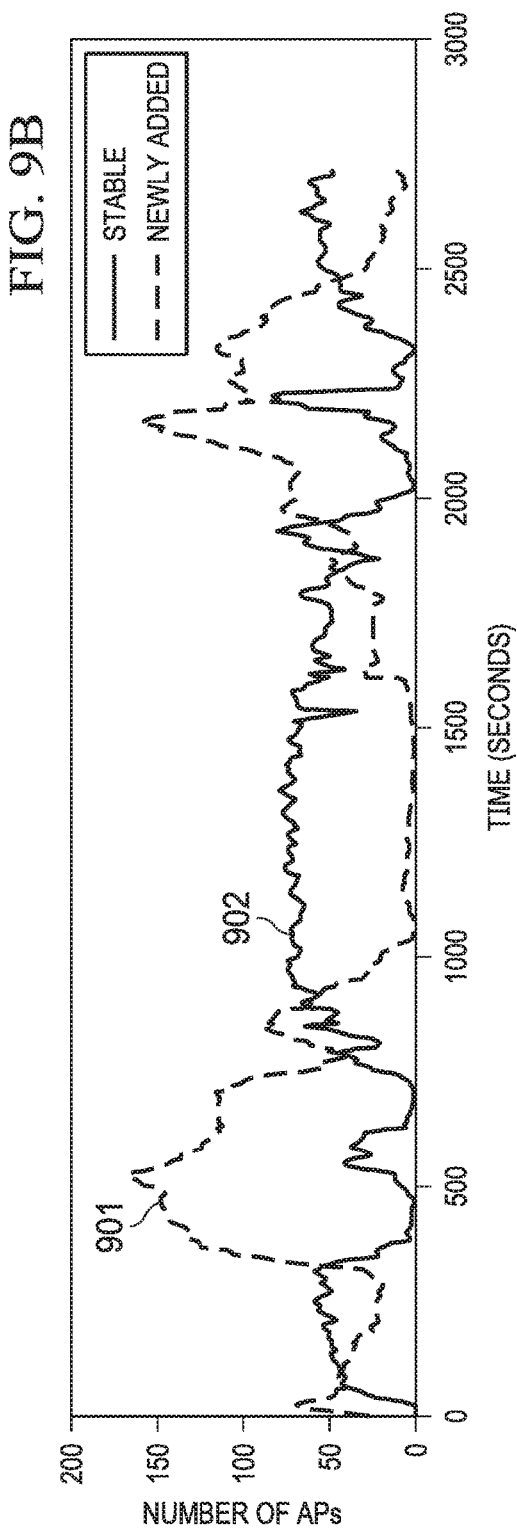
FIG. 9B is a plot of a number of stable and newly added APs, according to an embodiment.

FIG. 9A is a plot of the WiFi state of a wearable computer over time, according to an embodiment. FIG. 9B is a plot of stable and newly added APs over time, according to an embodiment. As can be observed by these plots, WiFi scans are reliable indicators of whether a wearable computer is indoors or outdoors. In this example, while the user is walking to the gym the number of newly APs increase and the number of stable APS decrease. While the user is exercising on a treadmill, the number of new APs decrease and the number of stable APs is fairly constant.

Figure 10:
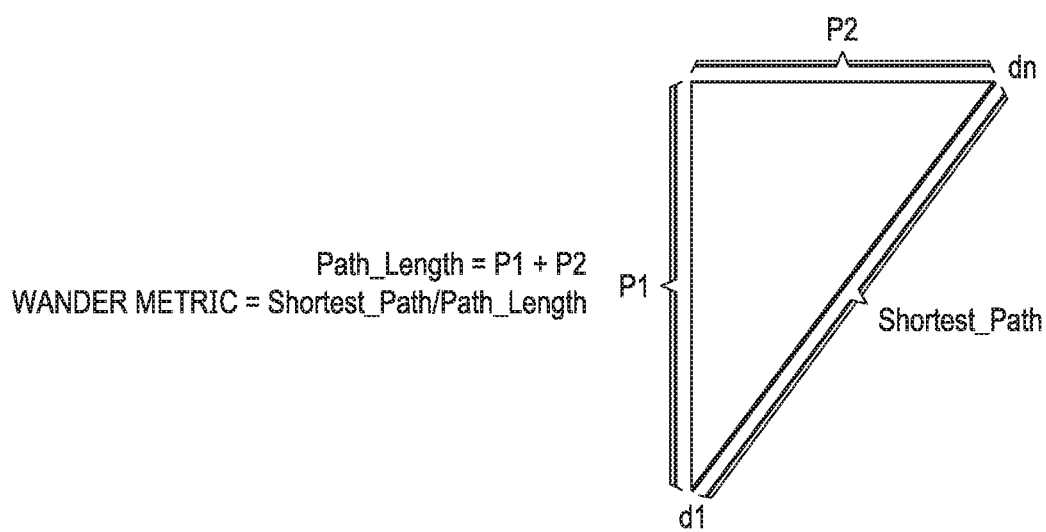
FIG. 10 illustrates computing a twisty state, according to an embodiment.

FIG. 10 illustrates computing a twisty state, according to an embodiment. As previously described in reference to FIG. 4, an IMU wander state can be monitored to help determine if the wearable computer is indoors or outdoors. The state C2 (twisty) is a metric that indicates whether the trajectory of the wearable computer is straight or turning. A straight trajectory suggests an indoor state (e.g., the user is on a treadmill) and a turning trajectory suggests an outdoor state (e.g., the user is running on a trail). Referring to FIG. 10, a path_length and shortest_path are computed using output of the pedometer propagation Equations [1] and [2], where path_length=P1+P2 and shortest_path is determine using a triangle formula, where d is the pedometer delta distance. The twisty state is determined from the ratio of the shortest_path to the path_length. If the ratio is 1, the path is straight. If the ratio is 0.707, the path has turned 90 degrees. By comparing the ratio at each measurement epoch with a threshold value, the wander metric can be determined. For example, referring to FIG. 4, if while in state C1 the ratio indicates a 90 degree turn, the IMU wander state will transition into the twist state C2.

Example Processes

Figure 11:
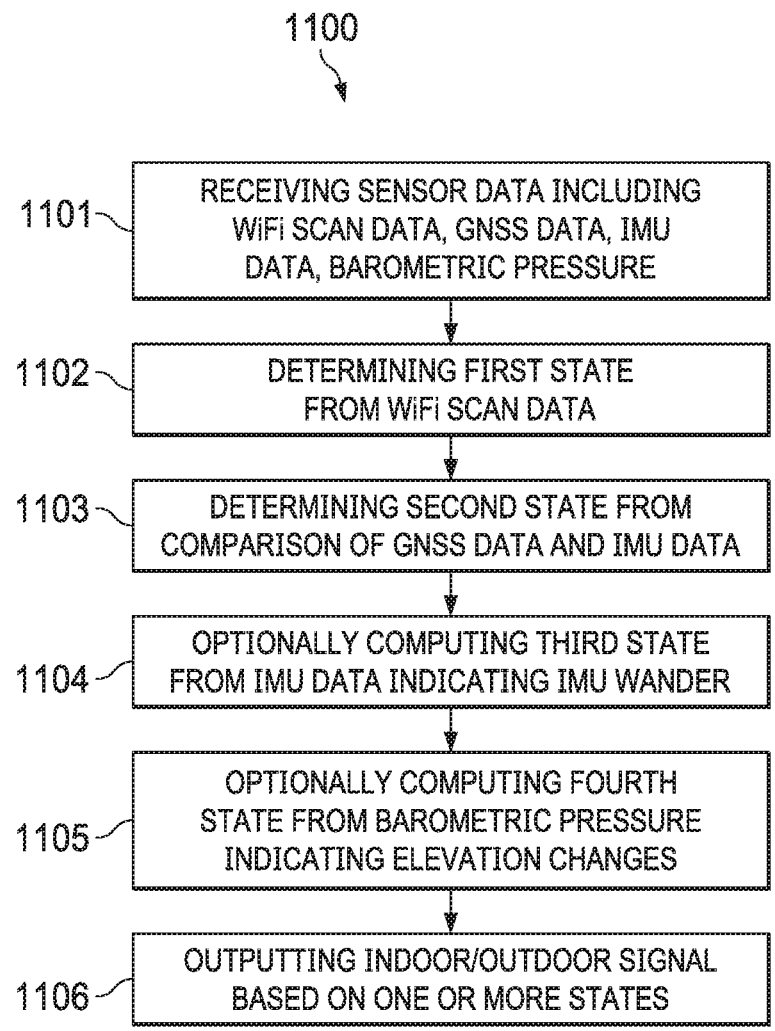
FIG. 11 is a flow diagram of a process for indoor/outdoor detection, according to an embodiment.

FIG. 11 is a flow diagram of a process 1100 for indoor/outdoor detection, according to an embodiment. Process 1100 can be implemented by architecture 1200, as described in reference to FIG. 12.

Process 1100 begins by receiving, by one or more processors of a wearable computer, wireless access point (AP) scan data, global navigation satellite system (GNSS) data and inertial sensor data (1101). The wireless AP data can be WiFi scan data, the GNSS data can be global positioning system (GPS) position and velocity/speed estimates from a GNSS receiver and inertial sensor data can be acceleration and angular rate output by accelerometers and gyroscopes of an inertial measurement unit (IMU).

Process 1100 continues by determining, by the one or more processors, a first state of the wearable computer based on the wireless AP scan data (1102). For example, WiFi scans are analyzed to determine whether new APs have been observed do determine if the wearable computer is stationary (indicative of an indoor state) or non-stationary (indicative of an outdoor state).

Process 1100 continues by determining, by the one or more processors, a second state of the wearable computer based on a comparison of the GNSS data and the inertial sensor data (1103). For example, a pedometer trajectory computed from inertial sensor data and equations of motion and compared to GNSS odometer propagation data from the GNSS receiver to determine if the trajectories are discordant (e.g., drifting apart). Discordance between GNSS data and inertial sensor (IMU) data indicates an indoor state. In an embodiment, a distance residual and angle residual are computed from the trajectories over a short time interval to account for gyro drift and error propagation. In an embodiment, the GNSS odometer trajectory is periodically reset every K epochs with the pedometer trajectory (truth or reference trajectory).

Process 1100 continues by optionally determining, by the one or more processors, a third state from inertial sensor data indicating that wearable computer is wandering (1104). For example, acceleration and heading data can be used to determine if the wearable computer is moving straight or turning, as described in further detail in reference to FIG. 10. Wandering indicates an outdoor state.

Process 1100 continues by optionally determining, by the one or more processors, a fourth state from a barometric pressure sensor indicating that the wearable computer is changing elevation (1105). For barometric pressure data can be used to determine if the elevation or altitude of the wearable computer is changing, which can indicate a hilly or flat environment. A hilly environment indicates an outdoor state and a flat environment indicates an indoor state.

Process 1100 continues by outputting, by the one or more processors, an indoor/outdoor signal indicating that the wearable computer is indoors or outdoors based on one or more of the first, second, third and fourth states (1106).

Figure 12:
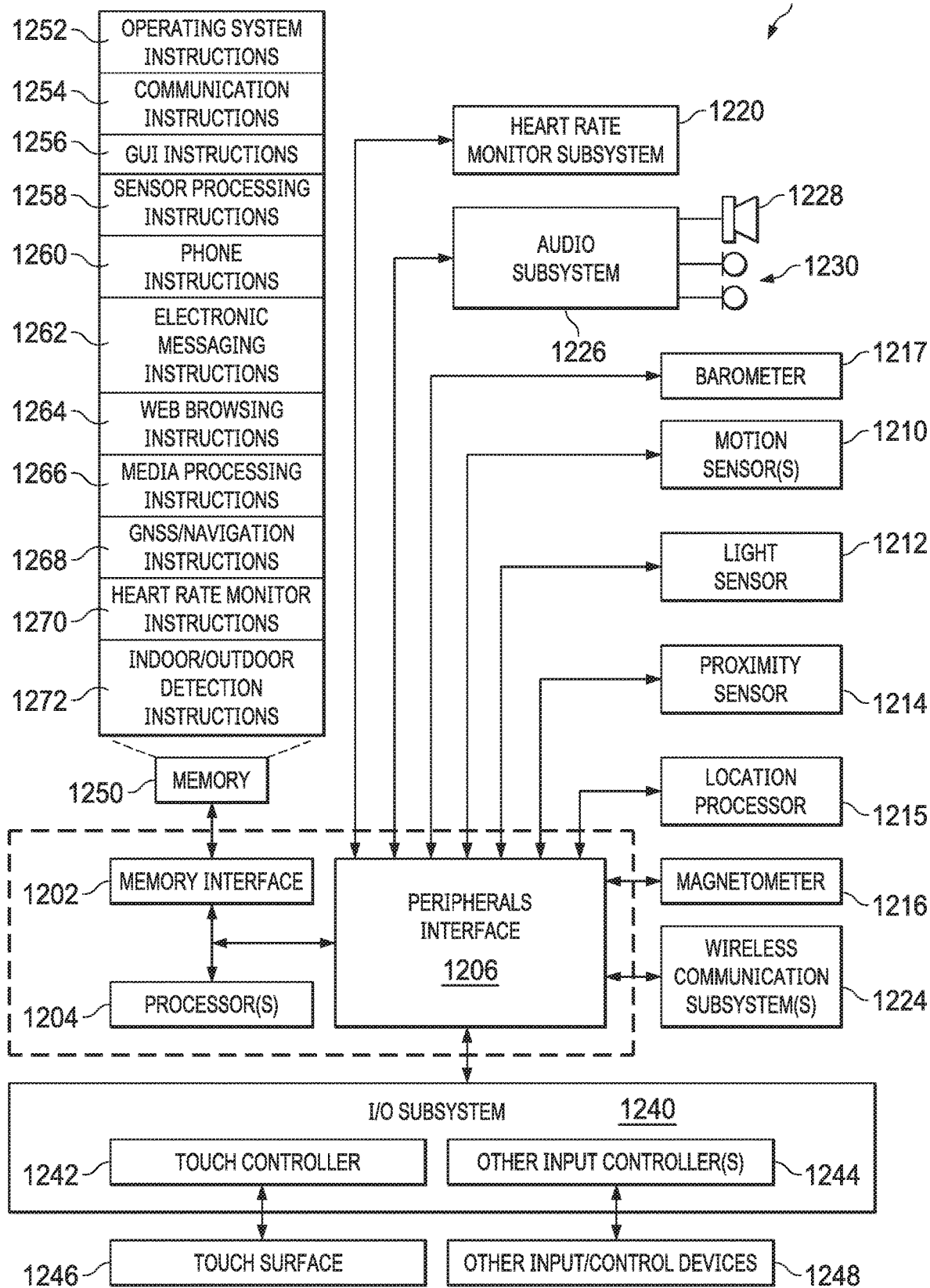
FIG. 12 is example wearable computer architecture for a wearable computer implementing the features and operations described in reference to FIGS. 1-11.

The signal can be used by a fitness application to determine a particular action to perform. For example, a fitness application can use the indoor/outdoor signal to determine information to display to the user (e.g., a map for outdoor state). An operating system or power management system can use the indoor/outdoor signal to power down certain components. For example, if an indoor state is indicated then the GNSS receiver can be powered down to save power. The signal can be used to determine how to measure a user's exertion, such as sensing heart rate to estimate calories burned while indoors Exemplary Wearable Computer Architecture FIG. 12 illustrates example wearable computer architecture 1200 implementing the features and operations described in reference to FIGS. 1-11. Architecture 1200 can include memory interface 1202, one or more data processors, image processors and/or processors 1204 and peripherals interface 1206. Memory interface 1202, one or more processors 1204 and/or peripherals interface 1206 can be separate components or can be integrated in one or more integrated circuits.

Sensors, devices and subsystems can be coupled to peripherals interface 1206 to provide multiple functionalities. For example, one or more motion sensors 1210, light sensor 1212 and proximity sensor 1214 can be coupled to peripherals interface 1206 to facilitate motion sensing (e.g., acceleration, rotation rates), lighting and proximity functions of the wearable computer. Location processor 1215 can be connected to peripherals interface 1206 to provide geopositioning. In some implementations, location processor 1215 can be a GNSS receiver, such as the Global Positioning System (GPS) receiver. Electronic magnetometer 1216 (e.g., an integrated circuit chip) can also be connected to peripherals interface 1206 to provide data that can be used to determine the direction of magnetic North. Electronic magnetometer 1216 can provide data to an electronic compass application. Motion sensor(s) 1210 can include one or more accelerometers and/or gyros configured to determine change of speed and direction of movement of the wearable computer. Barometer 1217 can be configured to measure atmospheric pressure around the mobile device. Heart rate monitoring subsystem 1220 can be configured to measure the heartbeat of a user who is wearing the computer on their wrist. In an embodiment, subsystem 1220 includes LEDs paired with photodiodes for measuring the amount of light reflected from the wrist (not absorbed by the wrist) to detect a heartbeat.

In an embodiment, one or more image capture devices are coupled to peripherals interface 1206, such as a digital camera that can capture digital images, video and a depth sensor that that can capture depth data for localization (e.g., visual odometry), object detection, facial recognition, augmented reality (AR), virtual reality (VR) and other applications. In an embodiment, a light detecting and ranging (LIDAR) sensor or an infrared depth sensor is coupled to peripherals interface 1206 for generating depth data.

Communication functions can be facilitated through wireless communication subsystems 1224, which can include radio frequency (RF) receivers and transmitters (or transceivers) and/or optical (e.g., infrared) receivers and transmitters. The specific design and implementation of the communication subsystem 1224 can depend on the communication network(s) over which a mobile device is intended to operate. For example, architecture 1200 can include communication subsystems 1224 designed to operate over a GSM network, 3G, 4G, 5G, a GPRS network, an EDGE network, a WiFi network, near field (NF) and a Bluetooth network. In particular, the wireless communication subsystems 1224 can include hosting protocols, such that the mobile device can be configured as a base station for other wireless devices.

Audio subsystem 1226 can be coupled to a speaker 1228 and one or more microphones 1230 to facilitate voice-enabled functions, such as voice recognition, voice replication, digital recording and telephony functions. Audio subsystem 1226 can be configured to receive voice commands from the user.

I/O subsystem 1240 can include touch surface controller 1242 and/or other input controller(s) 1244. Touch surface controller 1242 can be coupled to a touch surface 1246. Touch surface 1246 and touch surface controller 1242 can, for example, detect touch contact and movement (gestures) or break thereof using any of a plurality of touch sensitivity technologies, including but not limited to capacitive, resistive, infrared and surface acoustic wave technologies, as well as other proximity sensor arrays or other elements for determining one or more points of contact with touch surface 1246. Touch surface 1246 can include, for example, a touch screen or the digital crown of a smart watch. I/O subsystem 1240 can include a haptic engine or device for providing haptic feedback (e.g., vibration) in response to commands from processor 1204. In an embodiment, touch surface 1246 can be a pressure-sensitive surface.

Other input controller(s) 1244 can be coupled to other input/control devices 1248, such as one or more buttons, rocker switches, thumb-wheels, infrared ports, Thunderbolt® ports and USB ports. The one or more buttons (not shown) can include an up/down button for volume control of speaker 1228 and/or microphone 1230. Touch surface 1246 or other controllers 1244 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1246; and a pressing of the button for a second duration that is longer than the first duration may turn power to the mobile device on or off. The user may be able to customize a functionality of one or more of the buttons. The touch surface 1246 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 1202 can be coupled to memory 1250. Memory 1250 can include high-speed random access memory and/or non-volatile memory, such as one or more magnetic disk storage devices, one or more optical storage devices and/or flash memory (e.g., NAND, NOR). Memory 1250 can store operating system 1252, such as the iOS operating system developed by Apple Inc. of Cupertino, Calif. Operating system 1252 may include instructions for handling basic system services and for performing hardware dependent tasks. In some implementations, operating system 1252 can include a kernel (e.g., UNIX kernel).

Memory 1250 may also store communication instructions 1254 to facilitate communicating with one or more additional devices, one or more computers and/or one or more servers, such as, for example, instructions for implementing a software stack for wired or wireless communications with other devices. Memory 1250 may include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Location instructions 1268 to facilitate generic GNSS and location-related processes and instructions; and heart rate monitoring instructions 1270 to facilitate heart rate monitoring. Memory 1250 further includes indoor/outdoor detection instructions 1272 for performing the features and processes described in reference to FIGS. 1-10. In an embodiment, sensor-processing instructions 1258 include a digital pedometer application that receives motion sensor data (e.g., acceleration data, angular rate data) and computes at least one of steps take, step frequency, user stride length, user speed or distance traveled.

Each of the above identified instructions and applications can correspond to a set of instructions for performing one or more functions described above. These instructions can be implemented as separate software programs, procedures, or modules or as a single body of code. Memory 1250 can include additional instructions or fewer instructions. Various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:
   receiving, using one or more processors of a wearable computer, wireless access point (AP) scan data, global navigation satellite system (GNSS) data and inertial sensor data;
   computing, using the one or more processor, a first trajectory of the wearable computer from the inertial sensor data;
   computing, using the one or more processors, a second trajectory of the wearable computer from the GNSS data;
   determining, using the one or more processors, a first state of the wearable computer based on the wireless AP scan data;
   determining, using the one or more processors, a second state of the wearable computer based on a comparison of the first trajectory and the second trajectory;
   generating outputting, using the one or more processors, an indoor/outdoor signal indicating that the wearable computer is indoors or outdoors based on the first and second states; and
   using the indoor/outdoor signal to perform an action on the wearable computer including at least one of determining information to display to a user of the wearable computer, powering down one or more components of the wearable computer or measuring the user's physical exertion.

2. The method of claim 1, further comprising:
   determining, using the one or more processors, a third state of the wearable computer based on whether the wearable computer is moving in a straight line or turning based on the inertial sensor data; and
   generating, using the one or more processors, an indoor/outdoor signal indicating that the wearable computer is indoors or outdoors based on the first, second and third states.

3. The method of claim 2, wherein determining the third state further comprises:
   computing pedometer data from the inertial sensor data;
   computing, using the pedometer data, a path length from a first location to a second location;
   determining a shortest path from the first location and the second location;
   computing a ratio of the shortest path to the path length; and
   determining whether the wearable computer is turning based at least in part on the ratio.

4. The method of claim 1, further comprising:
   receiving, using the one or more processors of a wearable computer, elevation data;
   determining, using the one or more processors, a third state of the wearable computer based on one or more changes in the elevation data; and
   generating, using the one or more processors, an indoor/outdoor signal indicating that the wearable computer is indoors or outdoors based on the first, second and third states.

5. The method of claim 1, wherein computing a first trajectory of the wearable computer from the inertial sensor data further comprises:
   computing digital pedometer data from the inertial data; and
   computing the first trajectory from the pedometer data.

6. The method of claim 5, wherein determining, using the one or more processors, a second state of the wearable computer based on a comparison of the first trajectory and the second trajectory further comprises:
   determining a distance metric by differencing GNSS position data and the digital pedometer data;
   determining an angular metric by differencing a first angle generated by a gyroscope and a second angle included in or determined from the GNSS data; and
   determining that the first and second trajectories are discordant based on the distance metric and the angular metric.

7. The method of claim 1, wherein the second trajectory is reset periodically to coincide with the first trajectory.

8. An apparatus comprising:
   one or more processors;
   memory storing instructions that when executed by one or more processors, cause the one or more processors to perform operations comprising:
   receiving wireless access point (AP) scan data, global navigation satellite system (GNSS) data and inertial sensor data;
   computing a first trajectory of the apparatus from the inertial sensor data;
   computing a second trajectory of the apparatus from the GNSS data;
   determining a first state of the apparatus based on the wireless AP scan data;
   determining a second state of the apparatus based on a comparison of the first trajectory and the second trajectory;
   generating an indoor/outdoor signal indicating that the apparatus is indoors or outdoors based on the first and second states; and
   using the indoor/outdoor signal to perform an action on the apparatus including at least one of determining information to display to a user of the apparatus, powering down one or more components of the apparatus or measuring the user's physical exertion.

9. The apparatus of claim 8, further comprising:
   determining a third state of the apparatus based on whether the apparatus is moving in a straight line or turning based on the inertial sensor data; and
   generating an indoor/outdoor signal indicating that the apparatus is indoors or outdoors based on the first, second and third states.

10. The apparatus of claim 9, wherein determining the third state further comprises:
    computing pedometer data from the inertial sensor data;
    computing, using the pedometer data, a path length from a first location to a second location;
    determining a shortest path from the first location and the second location;
    computing a ratio of the shortest path to the path length; and
    determining whether the apparatus is turning based at least in part on the ratio.

11. The apparatus of claim 8, further comprising:
receiving elevation data;
determining a third state of the apparatus based on one or more changes in the elevation data; and
generating an indoor/outdoor signal indicating that the apparatus is indoors or outdoors based on the first, second and third states.

12. The apparatus of claim 8, wherein computing the first trajectory further comprises:
computing digital pedometer data from the inertial data; and
computing a first trajectory from the pedometer data.

13. The apparatus of claim 12, wherein the second trajectory is reset periodically to coincide with the first trajectory.

14. The apparatus of claim 12, wherein determining whether the first and second trajectories are discordant further comprises:
determining a distance metric by differencing GNSS position data and the digital pedometer data;
determining an angular metric by differencing a first angle generated by at least one gyroscope and a second angle included in or determined from the GNSS data; and
determining that the first and second trajectories are discordant based on the distance metric and the angular metric.

15. A non-transitory, computer-readable storage medium having stored thereon instructions that when executed by one or more processors of a wearable computer, cause the one or more processors to perform operations comprising:
receiving wireless access point (AP) scan data, global navigation satellite system (GNSS) data and inertial sensor data;
computing a first trajectory of the wearable computer from the inertial sensor data;
computing a second trajectory of the wearable computer from the GNSS data;
determining a first state of the wearable computer based on the wireless AP scan data;
determining a second state of the wearable computer based on a comparison of the first and second trajectory;
generating an indoor/outdoor signal indicating that the wearable computer is indoors or outdoors based on the first and second states; and
using the indoor/outdoor signal to perform an action on the wearable computer including at least one of determining information to display to a user of the wearable computer, powering down one or more components of the wearable computer or measuring the user's physical exertion.

16. The non-transitory, computer-readable storage medium of claim 15, further comprising:
determining a third state of the wearable computer based on whether the wearable computer is moving in a straight line or turning based on the inertial sensor data; and
generating an indoor/outdoor signal indicating that the wearable computer is indoors or outdoors based on the first, second and third states.

17. The non-transitory, computer-readable storage medium of claim 16, wherein determining the third state further comprises:
computing pedometer data from the inertial sensor data;
computing, using the pedometer data, a path length from a first location to a second location;
determining a shortest path from the first location and the second location;
computing a ratio of the shortest path to the path length; and
determining whether the wearable computer is turning based at least in part on the ratio.

18. The non-transitory, computer-readable storage medium of claim 15, further comprising:
receiving elevation data;
determining a third state of the wearable computer based on one or more changes in the elevation data; and
outputting an indoor/outdoor signal indicating that the wearable computer is indoors or outdoors based on the first, second and third states.

19. The non-transitory, computer-readable storage medium of claim 15, wherein computing the first trajectory further comprises:
computing digital pedometer data from the inertial data; and
computing a first trajectory from the pedometer data.

20. The non-transitory, computer-readable storage medium of claim 19, wherein the second trajectory is reset periodically to coincide with the first trajectory.

21. The non-transitory, computer-readable storage medium of claim 19, wherein determining whether the first and second trajectories are discordant further comprises:
determining a distance metric by differencing GNSS position data and the digital pedometer data;
determining an angular metric by differencing a first angle generated by a gyroscope and a second angle included in or determined from the GNSS data; and
determining that the first and second trajectories are discordant based on the distance metric and the angular metric.

* * * * *

UNITED STATES PATENT AND TRADEMARK OFFICE
CERTIFICATE OF CORRECTION

PATENT NO. : 10,845,203 B2
APPLICATION NO. : 16/146688
DATED : November 24, 2020
INVENTOR(S) : Vinay R. Majjigi et al.

Page 1 of 1

It is certified that error appears in the above-identified patent and that said Letters Patent is hereby corrected as shown below:

In the Claims

Column 11, Line 32, in Claim 1, delete "generating outputting," and insert -- generating, --; and Column 13, Line 42, in Claim 15, after "trajectory;" insert -- and --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*